P. J. F. BATENBURG.
DRIVING AND STEERING AXLE.
APPLICATION FILED DEC. 17, 1919.
1,407,911.
Patented Feb. 28, 1922.
3 SHEETS—SHEET 3.
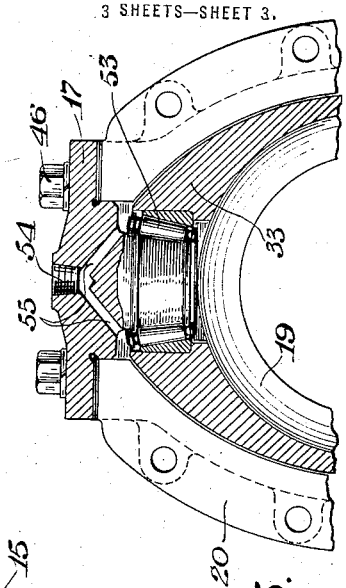
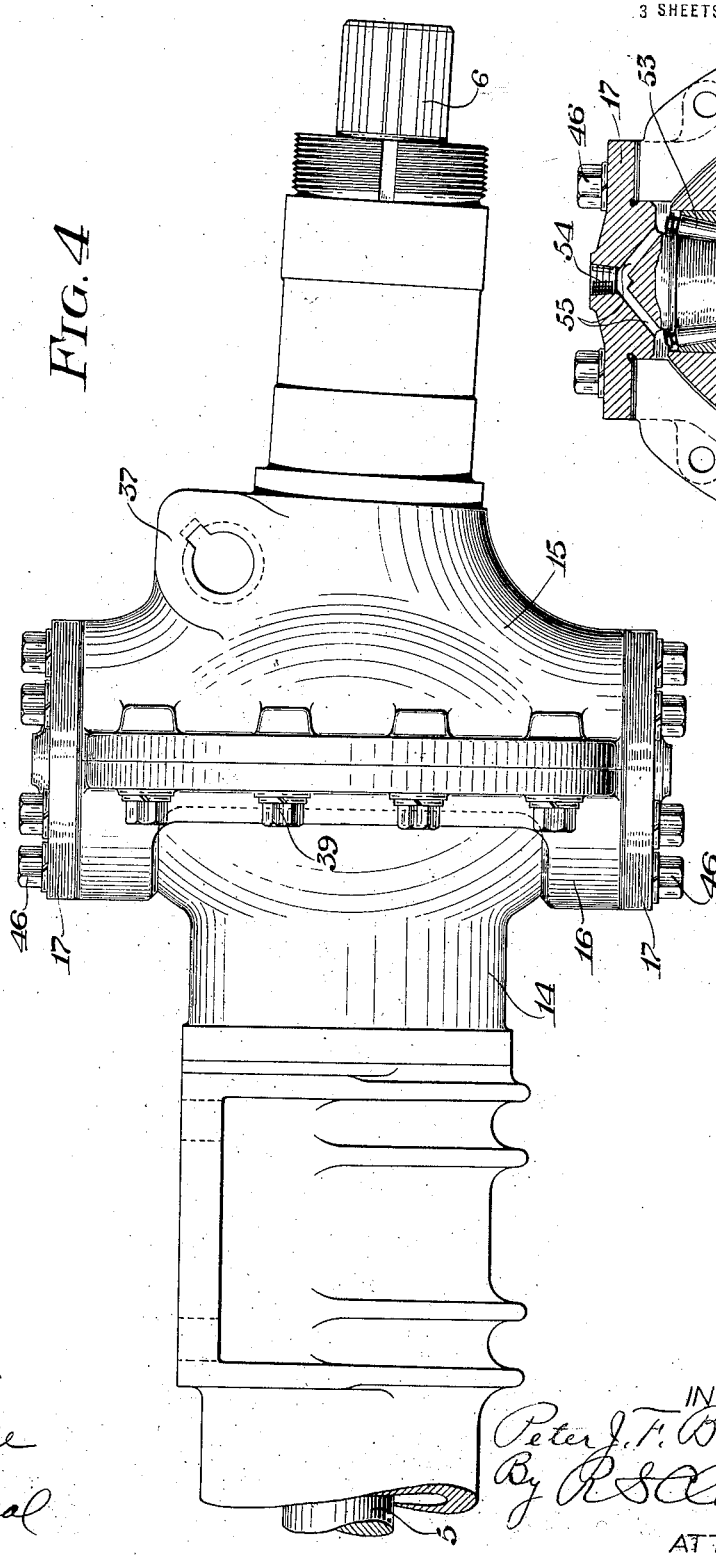
WITNESSES
O. E. Hyde
C. L. Waal
INVENTOR
Peter J. F. Batenburg
By R. S. Caldwell
ATTORNEY

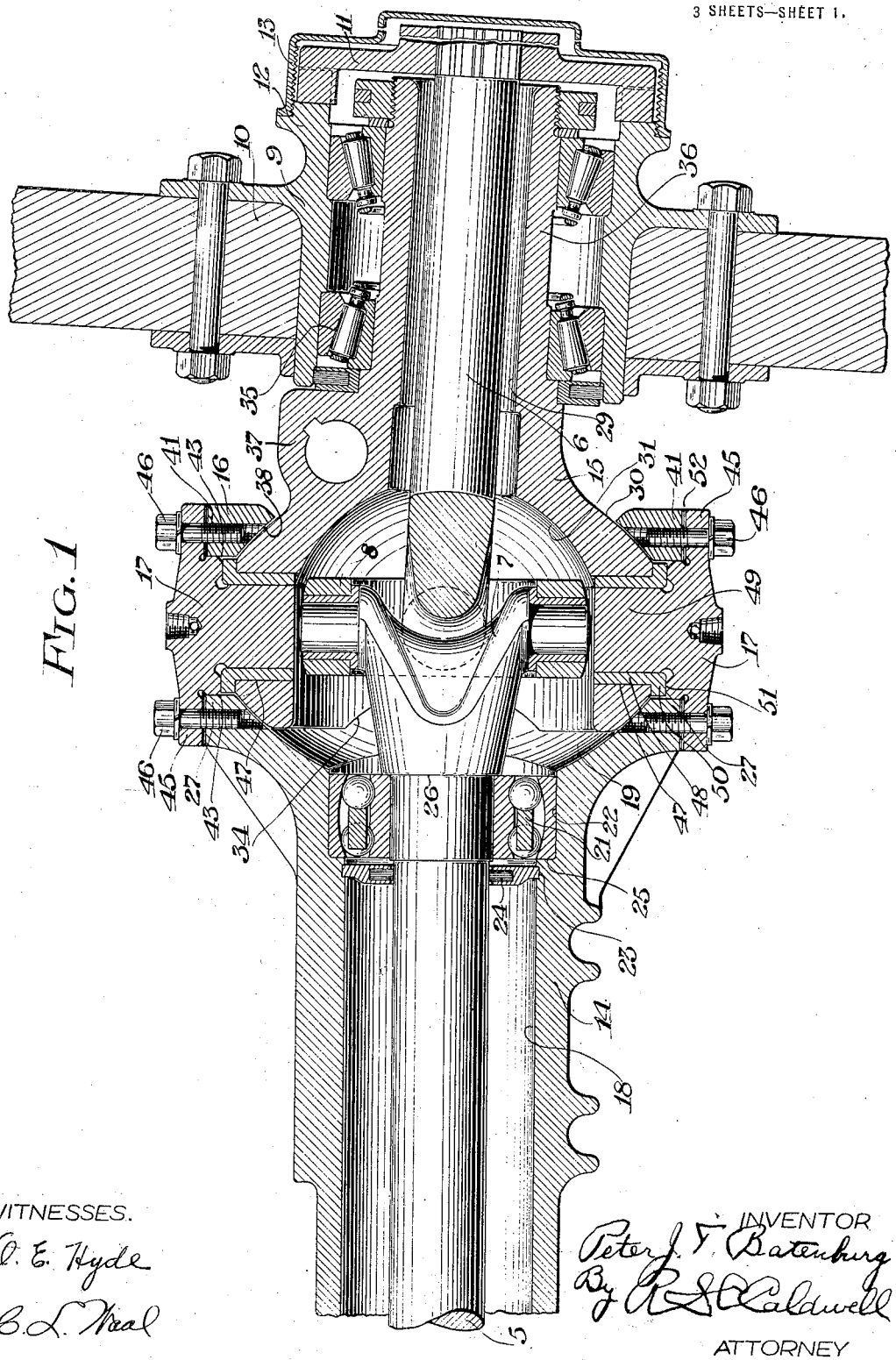

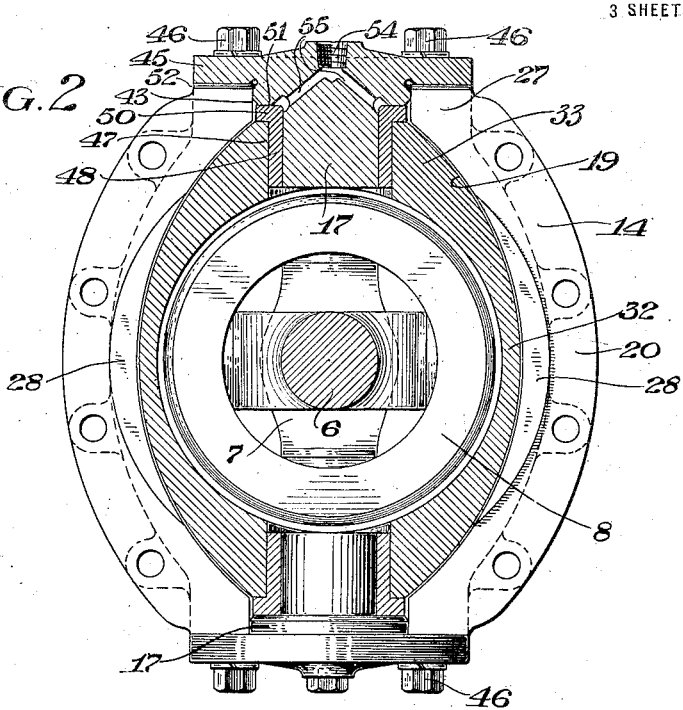
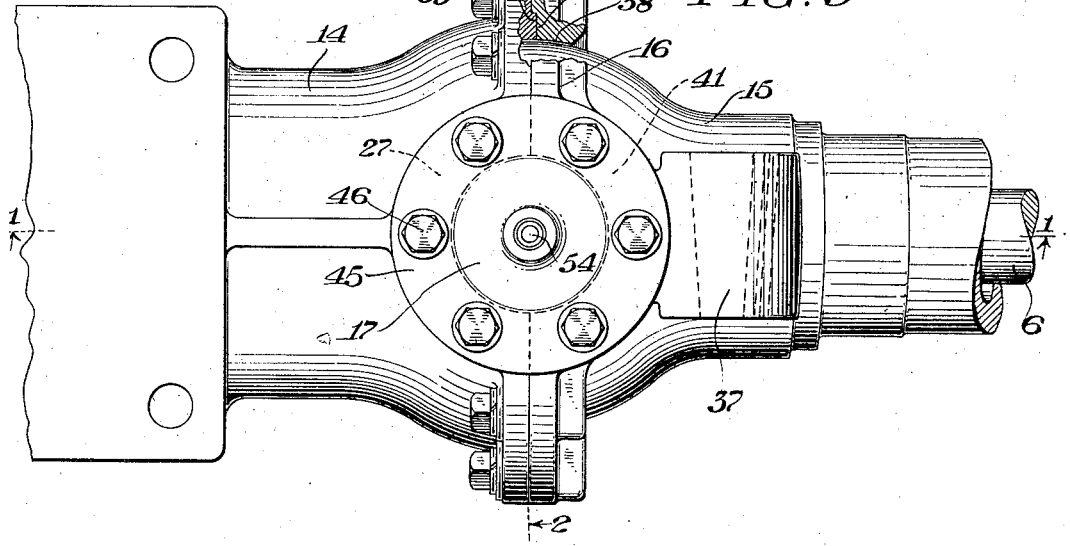

UNITED STATES PATENT OFFICE.

PETER J. F. BATENBURG, OF CLINTONVILLE, WISCONSIN.

DRIVING AND STEERING AXLE.

1,407,911.　　　　Specification of Letter Patent.　　Patented Feb. 28, 1922.

Application filed December 17, 1919. Serial No. 345,500.

*To all whom it may concern:*

Be it known that I, PETER J. F. BATENBURG, a subject of Queen Wilhelmina of the Netherlands, and resident of Clintonville, in the county of Waupaca and State of Wisconsin, have invented new and useful Improvements in Driving and Steering Axles, of which the following is a description, reference being had to the accompanying drawings, which are a part of this specification.

The invention relates to a driving and steering axle structure for motor driven vehicles in which the driving shaft passes through a supporting hollow axle, and in which parts of the driving shaft and axle may be turned for steering purposes.

One of the objects of this invention is to provide an improved hollow axle construction composed of two members having a jointed connection and secured in pivotal relation to each other by bearing trunnions secured to one of said members and to a retainer member.

Heretofore in driving and steering axle structures the trunnions uniting the parts forming the jointed hollow axle have been formed integral with one of said parts and projecting outwardly through the other part, which made adjustment of the trunnion bearings difficult. In the present construction the trunnions are separate from the main part of the hollow axle and are secured to one of said parts and project inwardly through the other part so that they may be easily removed for replacement of bearings or may be adjusted vertically to take up wear and to obtain the needed clearance and desired thrust.

Heretofore it has been the practice to form the jointed ends of the axle supporting structure of ball-shaped form, the walls of which are of uniform thickness, and the parts have to be made bulky and heavy to provide the requisite strength. To overcome this difficulty, in the present invention the jointed ends of the axle supporting structure are of elliptical or egg-shaped form with their major axes vertically disposed and the ends of the axle spindle are made thicker than its central portion to provide sufficient area and strength for the bearing trunnions.

The invention further consists in the several features hereinafter set forth and more particularly defined by claims at the conclusion hereof.

In the drawings: Fig. 1 is a vertical sectional view through the axle structure embodying the invention taken along the line 1—1 of Fig. 3; Fig. 2 is a section taken on the line 2—2 of Fig. 3; Fig. 3 is a plan view of the axle structure, parts being broken away and parts being shown in section; Fig. 4 is an elevation view of a slightly modified form of axle structure. Fig. 5 is a detail view similar to Fig. 2 showing a different form of trunnion bearing.

The wheel drive shaft is made up of the shaft 5 and swinging shaft 6 connected together by a universal joint 7 of well-known construction in which trunnions on the forked ends of said shafts are journalled in a ring 8. The hub 9 of the wheel 10 is driven from the shaft 6 in a well-known manner through a spider 11 connected to the shaft and having a driving engagement with the extension 12 of the hub 9. A cap 13 secured to the hub of the wheel covers the ends of the spider and shaft.

These shafts 5 and 6 are mounted in a hollow supporting axle housing structure, parts of which must be properly jointed so that the wheel and the shaft 6 may be turned to effect steering and the pivotal connections between these parts should have their vertical axes substantially coincident with the axis of the trunnions of the universal joint connection between said shafts. The axle housing consists of two main members 14 and 15 and a retainer member 16 which is secured to one of said main members, said parts being vertically pivotally connected together by trunnions 17.

The member 14 is fixedly secured to the vehicle and is provided with a longitudinally extending bore 18 and an outer end having an ellipsoidally curved inner surface 19 and a flange 20. The shaft 5 is disposed in the bore 18 and at its forward end is journalled in a bearing 21, such as a roller bearing, seated in an enlarged bore 22 concentric with the bore 18, and abutting against a shoulder 25 in the member 14. The inner member of the bearing 21 abuts against a shoulder 26 on the shaft 5. In this way any inward end thrust is transmitted to the member 14 from the shaft through the roller bearing 21 in a well-known manner. Outward thrusts of the traction wheel are not imparted to the shafts because of the loose connection of the spider 11 with the shaft and wheel. A split oil-retaining ring 24 is mounted in a groove 23 in the member 14. The member 14 has semi-cylindrical bosses 27 on its top and bottom and segmental tongues 28 in its outer end.

The member 15 is provided with a longitudinally extending bore 29 and its inner end is provided with an ellipsoidally curved outer surface 30 and a spherically curved inner surface 31. From Fig. 2 it will be noted that the side walls 32 of the end of the member 15 are thinner than the ends 33, which gives the requisite strength with a minimum amount of material. The outer edge of the inner end of the member 15 is provided with oppositely disposed notches 34 to provide clearance for the inner end of the shaft 5. The shaft 6 is disposed in the bore 29 and spaced from the walls thereof so as to revolve out of contact therewith. The wheel hub 9 is provided with a roller bearing 35 mounted on the outer end 36 of the member 15 which is provided with an apertured projection 37 adapted to receive a part of the steering mechanism to swing the shaft 6, member 15 and wheel 10 with respect to the shaft 5 and member 14 to accomplish the steering.

The retainer member 16 is in the form of a ring having an ellipsoidally curved inner surface 38 which forms a continuation of the surface 19 of the member 14 to which this member is secured by bolts 39 passing through the flange 20 and into the member 15. When thus joined together the inner surfaces 19 and 38 form an ellipsoidal surface in which the ellipsoidal end of the member 15 is mounted and free to turn in a horizontal plane. The member 16 is provided with semi-cylindrical bosses 41, similar to the bosses 27, on its top and bottom and with segmental grooves 42 in its outer end. The bosses 41, being complementary to the bosses 27, form cylindrical bosses when the parts 14 and 16 are joined together. The grooves 42 receive the tongues 28 to form an interlocking connection between the members 14 and 16.

Semi-cylindrical registering recesses 43 in the bosses 27 and 41 form bores in the top and bottom of the members 14 and 16 to receive the trunnions 17. Each trunnion has an annular flange 45 through which bolts 46 pass into the bosses 27 and 41, said bolts serving to clamp the trunnions in position.

The end of the member 15 has alined bores in its top and bottom concentric with the bores formed by the recesses 43, and are provided with bearings 48 in which the inwardly extending ends 49 of the trunnions 17 are mounted. In Figs. 1 and 2 the bearings 48 are shown as plain bushings having outwardly extending flanges 50 abutting against the member 15 and engaging annular shoulders 51 formed on the trunnions 17 so as to take up the thrust upon these pivotal connections. Shims 52 are disposed between the bosses 27, 41 and the flanges 45 so that the clearance between the shoulders 51 and the bearing may be adjusted. Thus the vertical thrusts imparted to the member 15 are transmitted through the bearings to the trunnions. Instead of a plain bearing, ball or roller bearings may be used and Fig. 5 shows a roller bearing for the trunnion 17 in which the rollers 53 transmit vertical thrusts to said trunnion. The trunnion bearings are supplied with lubricant through a conduit 54 and inclined conduits 55.

The pivot axes of the axle housing, that is, the axes of the trunnions 17, are substantially coincident with the joint of the universal jointed drive shaft and said parts are maintained in alignment so as to prevent rapid wear of the parts which would necessarily result from the straining or binding of the parts should they get out of alignment.

To maintain perfect alignment between the jointed axle and jointed drive shaft it is necessary that the trunnion bearings be readily accessible for inspection and replacement and be capable of adjustment to take up wear. These conditions are met in the present construction since the trunnions 17 are fastened to the outside of the supporting axle by the bolts 46 so that they may be bodily removed directly from the outside without the necessity for taking the supporting axle apart and when so removed furnish immediate access to the bearings 48, and since the adjustment is readily accomplished by the removal or addition of shims 52 and a tightening or loosening of the bolts 46. Furthermore, these advantages are obtained without weakening the parts.

The construction shown in Fig. 4 only differs from that previously described in that the position of the jointed ends of the members 14 and 15 is reversed and the retainer member 16 is secured to the member 15 with the trunnions 17 secured to the parts 15 and 16 in a manner identical with that previously described in connection with the members 14 and 16. Either arrangement may be used and both act in the same way to produce the same result.

Since the trunnions 17 engage the ends of the bearings in member 15 of Fig. 1 and 14 of Fig. 4, they may be so adjusted as to support the whole load, that is, the curved jointed surfaces of the members 14, 16 and 15 may be held out of bearing contact, the load forces being transmitted through the relatively fixed members or member of the axle housing to the trunnions and their bearings and thence to the swinging member or members of said housing.

It is to be understood that this invention is not limited to any specific form or arrangement of parts, except in so far as said limitations are specified in the claims.

What I claim as new and desire to secure by Letters Patent is:

1. A hollow supporting axle and housing for a universally jointed driving shaft comprising a relatively fixed shaft-housing part and a swinging shaft-housing part, the end of one part enclosing the end of the other part, and vertically disposed trunnions independent of either part and having flanged heads secured to the enclosing end and shanks pivotally mounted in the enclosed end.

2. A hollow supporting axle and housing for a universally jointed shaft, comprising a relatively fixed shaft-housing part and a swinging shaft-housing part, the end of one part being enclosed by that of the other part, said parts being vertically pivotally connected together, the pivotal connections comprising vertically disposed bearings carried in the enclosed end and vertically disposed trunnions mounted in said bearings and secured to the enclosing end, said trunnions and bearings being directly removable from outside the housing and the trunnions having an end thrust engagement with said bearings.

3. A hollow supporting axle and housing for a universal jointed driving shaft comprising shaft supporting and housing members having telescopically jointed ends, the outer of said ends having apertured cylindrical bosses with their axes in line with the axis of the joint of the driving shaft, the inner of said ends having bearings axially aligned with the apertures in said bosses, trunnions having their ends disposed in the apertures of said bosses and in said bearings and having flanged heads, and means securing the flanged heads of said trunnions to the outer of said ends.

4. A hollow supporting axle and housing for a universally jointed shaft comprising a relatively fixed shaft-housing part and a swinging shaft-housing part, the end of one part being enclosed by that of the other, said parts being vertically pivotally connected together, the pivotal connections including vertically disposed bearings seated on the enclosed end, said bearings being directly removable from outside the housing without separating the parts thereof.

5. A hollow supporting axle and housing for a universally jointed shaft comprising a relatively fixed shaft-housing part and a swinging shaft-housing part, the end of one part being enclosed by that of the other, said parts being vertically pivotally connected together, the pivotal connections including trunnions and bearings between the lower ends of the trunnions and the enclosed ends, said trunnions being secured to and mounted in openings in the enclosing end and removable from the exterior thereof, the bearings being directly removable through the trunnion-receiving openings in the enclosing end.

In testimony whereof, I affix my signature.

PETER J. F. BATENBURG.